United States Patent [19]

Srp, Jr.

[11] 4,150,815
[45] Apr. 24, 1979

[54] PIPE FITTING RECONDITIONING APPARATUS

[75] Inventor: Jim W. Srp, Jr., Corpus Christi, Tex.

[73] Assignee: Sun Petroleum Products Company, Philadelphia, Pa.

[21] Appl. No.: 847,875

[22] Filed: Nov. 2, 1977

[51] Int. Cl.² .............................................. B23K 7/04
[52] U.S. Cl. ....................................... 266/57; 279/12
[58] Field of Search ................ 266/54, 57; 82/33, 40, 82/45; 269/57, 319; 279/1 A, 12, 1 ME, 14

[56] References Cited

U.S. PATENT DOCUMENTS 2,805,057  9/1957  Bain ........................................ 266/57
2,825,572  3/1958  Sloan et al. .......................... 279/1 L Primary Examiner—Roy Lake
Assistant Examiner—Paul A. Bell
Attorney, Agent, or Firm—J. Edward Hess; Donald R. Johnson; James H. Phillips

[57] ABSTRACT

Pipe fittings are prepared for re-use by accurately re-beveling the pipe edges which are subsequently to be re-welded. A rotating table is provided with concentric rings which build up in height toward the center in order to accommodate the open end of various size fittings. A hand-crank is coupled to the rotary table to permit controlled rotation of a fitting being reconditioned. A vertically adjustable bracket is adapted to support a cutting torch directed at a predetermined angle, according to the bevel desired, proximate the upper end of the fitting. The table is then rotated with the crank through a full revolution in order to bevel the surface at which the torch is directed. As needed, the fitting may be inverted to refurbish a second end, and adapters may be provided to accommodate tees, elbows and the like.

3 Claims, 9 Drawing Figures

PIPE FITTING RECONDITIONING APPARATUS

BACKGROUND OF THE INVENTION

This invention relates to the pipe fitting arts and, more particularly, to a system for reconditioning used pipe fittings.

Pipe fittings, such as flanges, elbows, tees and the like, are used in vast quantities in such environments as refineries, chemical plants, and other industrial environments in which intricate pipe networks are found. It is characteristic of many such plants, that the pipe network is in a more or less constant state of rearrangement to make process changes, effect repairs, carry out system enlargements and so on. When it becomes necessary to remove a pipe fitting during such work, the practice is to expeditiously cut out the fitting with a torch. Such cutout fittings are routinely discarded as scrap because the edges left by the cutting process are not at all suitable for welding back up to an adjoining fitting or pipe. When new, the edges of such fittings are cleanly inwardly tapered and generally fall into a plane such that the edges may be juxtaposed with the edges of an adjoining piece in such a manner that the meeting tapers form a V-groove for receiving the weld bead.

The cost of new pipe fittings has become sufficiently high that it has been proposed to recondition the fittings on a large lathe rather than discarding them as scrap. However, the practice of reconditioning fittings on a lathe is itself a different and uneconomic procedure because of the difficult set-up necessary to handle large and very heavy fittings, the strain on the lathe employed, and the requisite use of a skilled machinist. Thus, it has generally been found that, notwithstanding the expense of new fittings, it has been cheaper and has remained the practice to discard pipe fittings rather than recondition them.

Thus, those skilled in the art and knowledgeable of the economics associated with the construction, maintenance, and revision of intricate pipe networks will understand it would be highly desirable to provide economical, yet accurate, means by which cutout pipe fittings may be reconditioned for re-use in place of corresponding new fittings.

It is therefore a broad object of my invention to provide simple means for accurately reconditioning used pipe fittings.

It is another object of my invention to provide such means which is economical to fabricate and use.

It is a still further object of my invention to provide such means which is versatile and capable of handling a large variety of fitting size and configurations.

SUMMARY OF THE INVENTION

Briefly, these and other objects of my invention are achieved by providing a horizontally disposed circular turntable rotatably mounted on a stationary support. The upper surface of the turntable comprises a series of concentric circular steps providing a corresponding series of different sized circular shoulders for receiving the inside diameters of various sizes of pipe fittings. A separate support standard is employed to hold a cutting torch, preferably horizontally, and the torch is fitted with a turned-up nozzle in order to obtain an angularly directed plane. Crank means are provided for manually turning the turntable at a controlled, relatively slow rate.

In operation, a used fitting is placed on the turntable with the edge to be reconditioned aimed upwardly. The fitting is shifted about until it drops over the appropriately sized shoulder which insures that it is centered. The torch is then positioned to make a cut from the outside in at a point below the rough cut and is aimed to obtain the desired bevel. After the flame first cuts through the fitting wall, the crank is turned to slowly rotate the turntable, and hence the fitting, past the stationary flame until a full 360° cut has been made. It is then only necessary to lift off the cutaway ring and perform routine slag clean-up and filling to complete the reconditioning operation. Several attachments are provided by which pieces such as elbows and tees may be accurately positioned on the turntable, and an accessory layover, also fitted with a series of circular concentric shoulders, is employed to accomodate very large pieces.

DETAILED DESCRIPTION OF THE INVENTION

The subject matter of the invention is particularly pointed out and distinctly claimed in the concluding portion of the specification. The invention, however, both as to organization and method of operation, may best be understood by reference to the following description taken in connection with the accompanying drawing of which:

Figure 1:
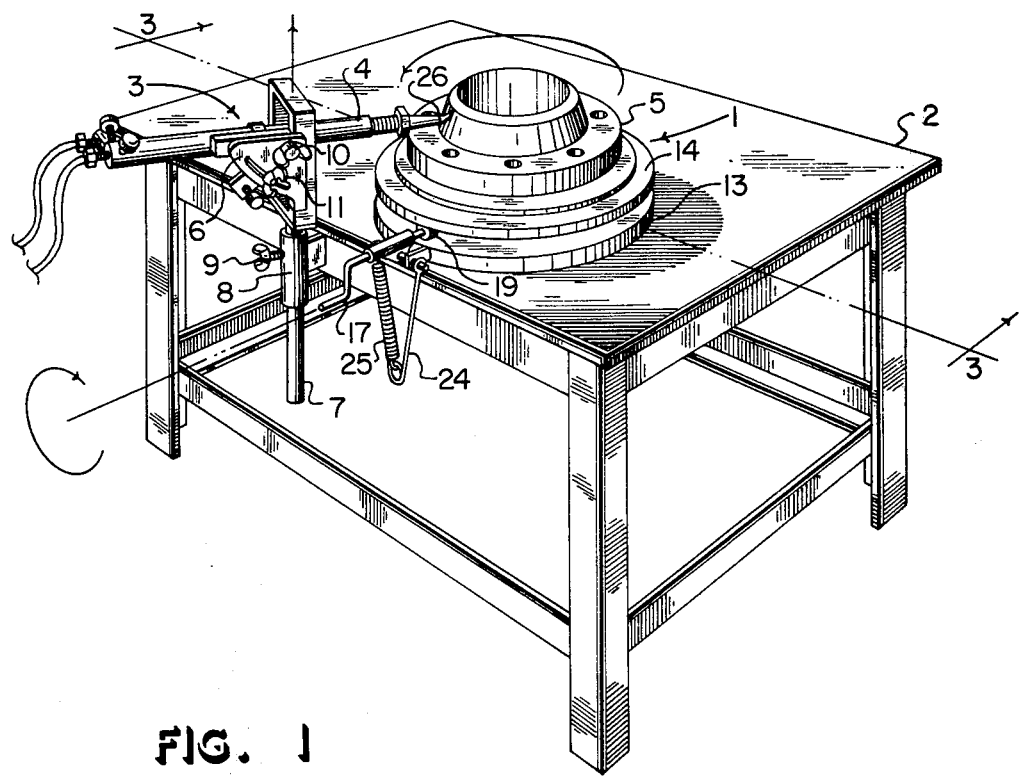
FIG. 1 is a perspective view illustrating the apparatus as it may be used to recondition an exemplary flange pipe fitting.

Referring now to FIG. 1, it will be observed that the pipe fitting reconditioning apparatus of the present invention includes two distinct fixtures. A turntable fixture 1 is supported on a table 2 or such other firm support means as may be convenient for a given installation. A torch standard fixture 3 is supported from the table 2 and serves to fixedly position a torch 4 with respect to a workpiece, such as the flange 5, on the turntable fixture 1.

Figure 2:
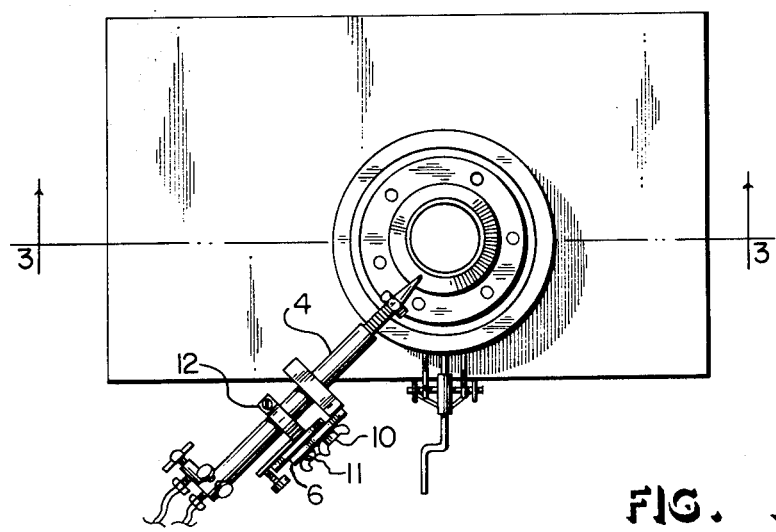
FIG. 2 is a top view of the apparatus of FIG. 1.

Referring both to FIGS. 1 and 2, it will be observed that the torch standard fixture 3 includes an adjustable bracket 6 carried by a downwardly extending rod 7 which passes through a cylinder tube 8 which is secured to the table 2, preferably by welding. A wing bolt 9 extends radially through a threaded aperture in the sidewall of the cylindrical tube 8 such that the inner end of the wing bolt 9 may be tightened against the rod 7 to fix it at a selected vertical height to correspondingly fix the torch 4 at a desired vertical position. The bracket 6, which directly supports the torch 4, may be pivoted by loosening wing bolts 10 and 11 such that the bracket 6 is free to pivot around the axis of the wing bolt 10. In this manner, the angle at which the torch is presented to a workpiece may be adjusted. It may be noted, however, that for most reconditioning operations, it is preferable, to facilitate a rapid set up, to simply adjust the bracket 6 such that the torch 4 is generally horizontal, and thereafter, this adjustment need not be reset. As will be described more completely hereinafter, the bevel cut to the workpiece is achieved by the use of an upwardly angled cutting tip 26. The torch 4 is fixed to the bracket 6 by any convenient means such as a clamp 12.

Figure 3:
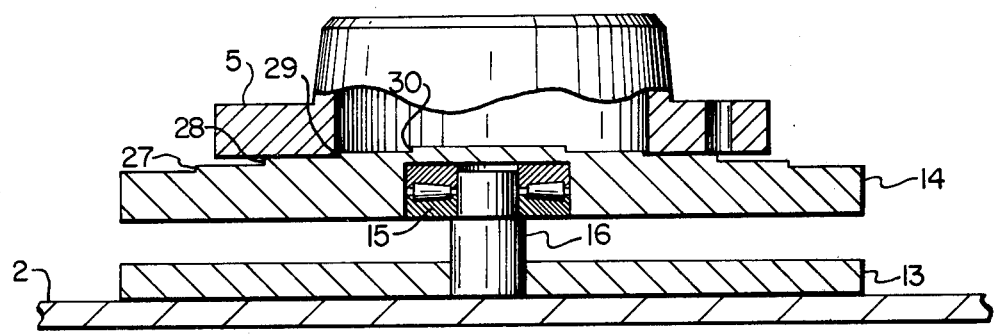
FIG. 3 is a cross-sectional view taken along the lines 3—3 of FIG. 2.

Referring now to both FIGS. 1 and 3, the turntable fixture 1 is shown to include a stationary base member 13 and a turntable 14 mounted to the base member. As best shown in FIG. 3, bearings 15 rotatably support the turntable 14 on an upstanding journal 16. Thus, it will be understood that the turntable 14, and hence a workpiece such as the flange 5, may be freely rotated with respect to the stationary base member 13, and hence the torch 4.

In order to accomodate workpieces of varying sizes, the upper surface of the turntable 14 comprises a series of shallow steps arranged as concentric circles about the axis of rotation of the turntable 14. Thus, a corresponding series of circular shoulders 27, 28, 29, 30 are provided at increasing heights from the outer edge of the turntable 14 to its center, and these shoulders are preferably spaced to just be accepted within the inner diameter dimension of standard sized workpieces.

Figure 5:
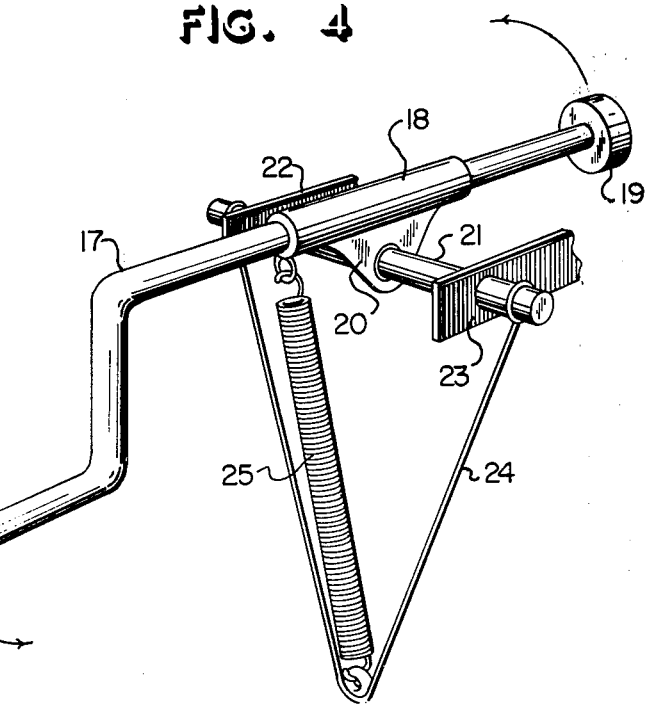
FIG. 5 is a detailed view of the crank means of the apparatus which may be employed to controllably rotate the turntable and workpiece.

Attention is now directed to FIGS. 1 and 5 which illustrate a simple and effective means for manually rotating the turntable 14. A crank 17 extends through a bushing 18 and has a roller 19 affixed to its inner end. A support member 20 for the bushing 18 is provided with an aperture through which a pivot pin 21 passes with enough clearance for mutual rotation. The pivot pin 21 extends through brackets 22, 23 which are welded to the base member 13. A V-shaped downwardly extending spring support 24 has one end of a tension spring 25 fixed thereto at the notch of the V. The other end of the tension spring 25 is secured to the outboard end of the bushing 18. As a result of the force applied by spring 25 to this point, the bushing tends to rotate about the pivot pin 21. As best shown in FIG. 1, the roller 19, which is preferably made of a resilient material such as neoprene rubber, bears on the underside of the turntable 14 near its outer edge. Because of the relatively small circumference of the roller 19, the turntable 14 can be manually rotated slowly and controllably by manipulating the handle end of the crank 17.

Figure 4:
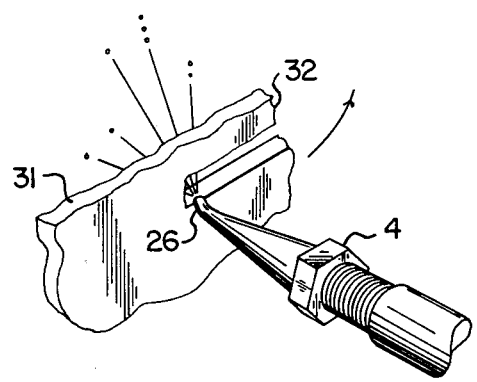
FIG. 4 is a fragmentary detailed view illustrating the interaction between the cutting torch means of the apparatus and the edge of a pipe fitting being reconditioned.

In operation, a fitting to be reconditioned, such as the flange 5, is lifted onto the turntable 14 and centered until the inside diameter drops over the appropriately sized shoulder on the stepped upper surface of the turntable. As shown in FIG. 3, the flange 5 fits over the shoulder 29. The torch 4 is then positioned within the bracket 3 to bring the cutting tip adjacent the outer wall of the fitting at the point where a beveled edge is to be cut. As shown in FIG. 4, this position will usually be just below the ragged edge 31 left by the cut by which the fitting was removed from a pipe system since it is desirable to save as much pipe length as possible to leave sufficient room for welding into the new system and also for possible use yet another time.

The operator adjusts the torch color and positions the torch so that it is aimed substantially radially with respect to the fitting. Once the torch has cut through at one spot, the operator slowly turns the crank while closely observing the cut, which, as best shown in FIG. 4, will leave a ring 32 of scrap just above the newly cut bevel. After 360° has been traversed, the ring of scrap may be removed, and it is then only necessary to remove any slag and do touch-up filing to complete the reconditioning operation. As previously mentioned, set-up time can be minimized by using an angled tip 26 to obtain the beveled edge. It will be understood, however, that the bracket 6 (FIG. 1) may be pivoted to obtain any desired angle to the torch for further adjusting the beveled angle or for cutting the bevel with a straight tip.

Figure 6:
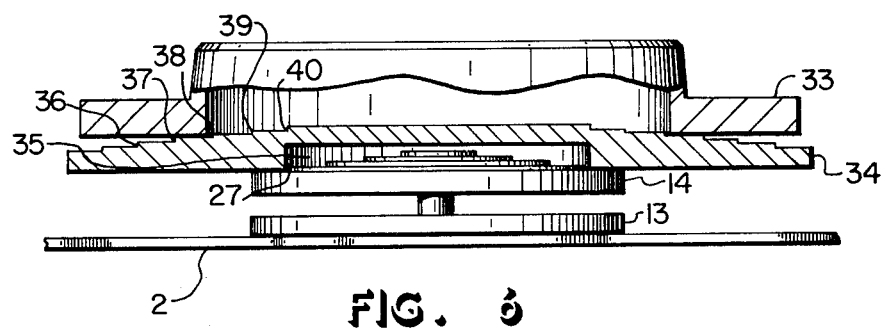
FIG. 6 illustrates the use of an adapter to accomodate larger fittings than may be ordinarily handled.

The pipe fittings to be reconditioned may be of diverse type and size. For example, a much larger flange than the flange 5 shown in FIGS. 1 and 3 may be handled as shown in FIG. 6. The large flange 33 rests on an adapter 34 which, in turn, is supported on the turntable 14. The adapter 34 has a coaxial circular cavity 35 machined into its underside, and the diameter of the cavity 35 is just sufficient to receive the outermost shoulder 27 on the upper surface of the turntable 14. The upper surface of the adapter 34 is also provided with a series of concentric circular strps to obtain shoulders 36, 37, 38, 39, 40 for receiving the internal diameters of larger sized fittings.

Figure 7:
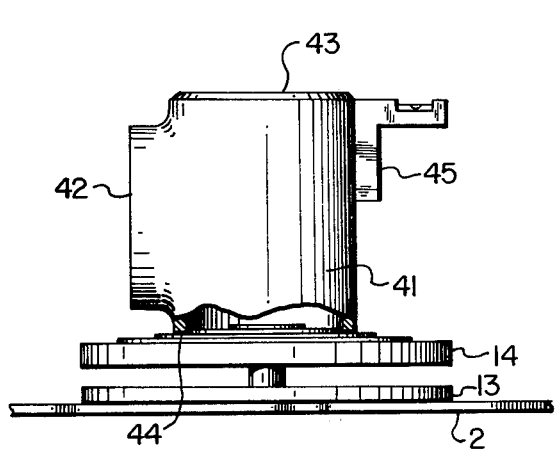
FIG. 7 illustrates the manner in which a tee fitting may be mounted to handle reconditioning one of the edges at the cross of the tee configuration.
Figure 8:
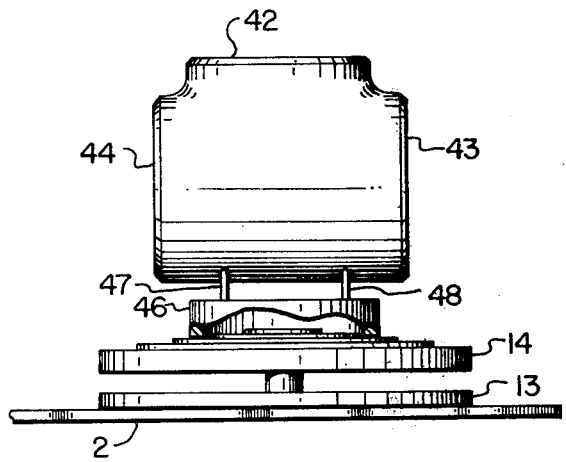
FIG. 8 illustrates the manner in which a cradle attachment may be used to support a tee fitting to recondition the base edge of the tee configuration.

Tee fittings may be supported for reconditioning as shown in FIGS. 7 and 8. Referring first to FIG. 7, tee fitting 41 is shown oriented on the turntable 14 with the teed-off port 42 directed horizontally. As shown in FIG. 7, the upper port 43 has just been reconditioned such that the tee fitting 41 may next be inverted in order to bring the lower port 44 into position for reconditioning. It may be noted that, since the edges of the upper and lower ports 43, 44 may well have been ragged from being cut from a pipe installation, it is necessary to insure that the fitting 41 is vertical prior to making the first reconditioning cut. This may be achieved by any logical means such as the use of the L-level 45 and the insertion of such shims between the edge of the port 44 and the upper surface of the turntable 14 as may be necessary to bring the fitting 41 to vertical. After the edge of port 43 has been reconditioned, it is correctly oriented such that it is not necessary to repeat the leveling operation after the filling is inverted to place the reconditioned edge onto the turntable 14. Those skilled in the art will appreciate that straight pipe sections and other fittings may require a like leveling or aligning operation in order to insure that the reconditioned edges are properly oriented with respect to the axis of the fitting.

The teed-off port 42 may be positioned for reconditioning by employing the cradle adapter 46 illustrated in FIG. 8. The cradle adapter 46 is provided with a concentric inner chamber 47 adapted to fit over one of the shoulders on the upper surface of the turntable 14. A pair of upwardly extending V-notched cradles, 47, 48 serve to support the tee fitting such that the axis of the ports 43 and 44 is horizontal. Thus, the tee fitting 41 may be rotated about this axis until the teed-off port 42 is level prior to carrying out the reconditioning step on that port.

Figure 9:
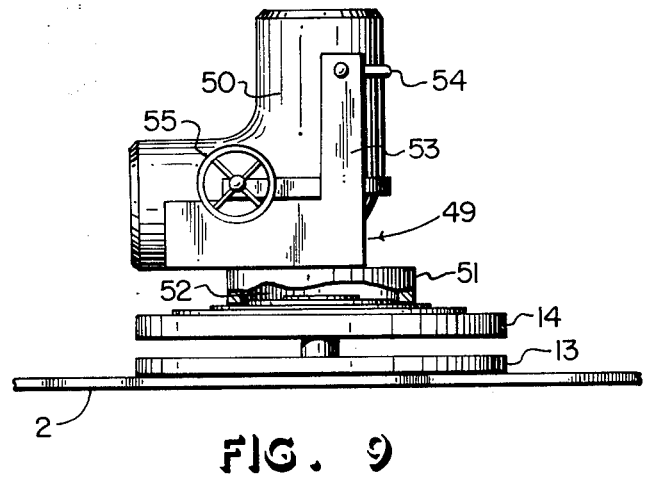
FIG. 9 illustrates another attachment for accomodating diversely configured fitting, such as elbows, to the reconditioning apparatus constituting the present invention.

Various other adapters may be incorporated into the apparatus for holding diverse fittings properly oriented with respect to the turntable 14 to achieve the reconditioning process. By way of example, the elbow adapter 49 shown in FIG. 9 has been found useful in the process of reconditioning elbow fittings such as the fitting 50. The elbow adapter 40 includes a base member 51 provided on its lower surface with a concentric chamber 52 dimensioned to just fit over one of the shoulders on the turntable 14. An upper bracket portion 53 of the elbow adapter serves to cradle and fix the elbow 50 in position with respect to the turntable 14. The upwardly directed section of the elbow fitting 50 may rest against a half ring 54 which extends from one side of the bracket 53 to the other side. The elbow 50 is fixed in place by advancing a wheel 55 which has a coaxial threaded shaft extending through a correspondingly threaded aperture in the bracket 53. Another wheel, like the wheel 55, may be provided on the other side of the bracket 53 to permit centering the fitting 50 in one dimension.

While the principles of the invention have now been made clear in an illustrative embodiment, there will be immediately obvious to those skilled in the art many modifications of structure, arrangements, proportions, the elements, materials and components, used in the practice of the invention which are particularly adapted for specific environments and operating requirements without departing from those principles.

I claim:

1. A system for refurbishing used pipe fittings:
   (A) a fitting support member including:
      (i) a stationary base;
      (ii) a platform including an upper surface having a plurality of graduated circular steps increasing in height from an outermost step to an innermost step;
      (iii) means rotatably supporting said platform above said base; and
      (iv) means for controllably rotating said platform;
   (B) a torch support member including:
      (i) an upright standard; and
      (ii) torch holding means fixed to said standard;
   (C) means for juxtaposing said torch support member with respect to said fitting support member; and
   (D) an adapter for supporting a pipe fitting, said first adapter including:
      (i) a base member adapted to fit over and rest upon one of said circular steps; and
      (ii) upwardly extending means supported by said base member and adopted to receive and hold a pipe fitting.

2. The system of claim 1 in which said upwardly extending means includes a clamp for rigidly fixing and holding a pipe fitting with respect to said base member.

3. A system for refurbishing used pipe fittings:
   (A) a fitting support member including:
      (i) a stationary base;
      (ii) a platform including an upper surface having a plurality of graduated circular steps increasing in height from an outermost step to an innermost step;
      (iii) means rotatably supporting said platform above said base; and
      (iv) means for controllably rotating said platform;
   (B) a torch support member including:
      (i) an upright standard; and
      (ii) torch holding means fixed to said standard;
   (C) means for juxtaposing said torch support member with respect to said fitting support member; and
   (D) an adapter for supporting a pipe fitting larger than can be supported directly on said platform, said adapter comprising:
      (i) a circular plate having an upper surface and a lower surface, said circular plate having an outside diameter which exceeds the outside diameter of said platform;
      (ii) a concentric circular cavity formed in said lower surface, said circular cavity being dimensioned to just fit over one of said graduated circular steps on the upper surface of said platform; and
      (iii) a plurality of graduated circular steps on said upper surface of said circular plate, said circular steps on said upper surface of said circular plate increasing in height from the outermost step to the innermost step.

* * * * *